Dec. 4, 1962    N. S. HOWE ETAL    3,066,330
TABLE-FEED MECHANISM FOR THREAD CUTTING MACHINE
Filed March 13, 1958    4 Sheets-Sheet 3
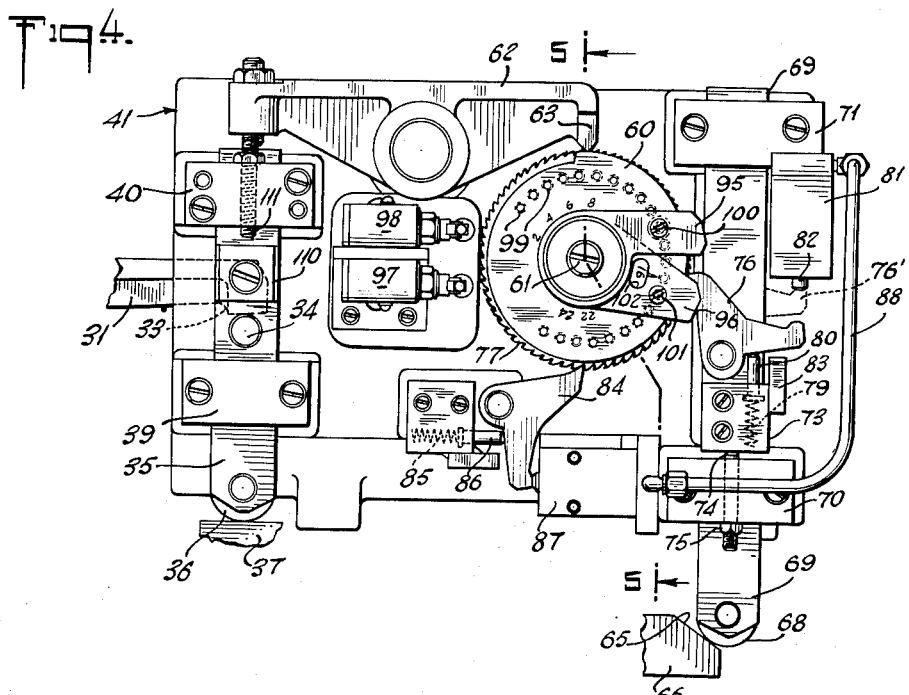
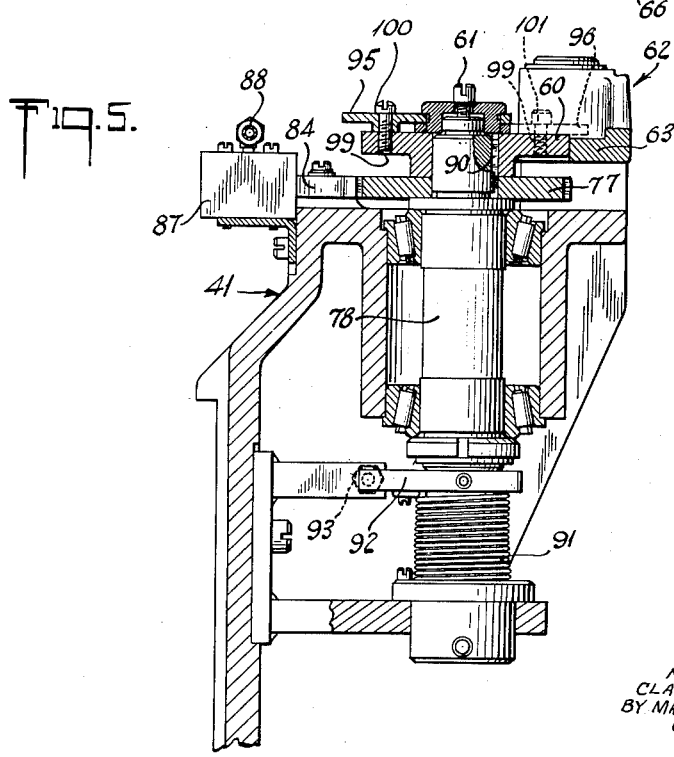
INVENTORS
NATHANIEL S. HOWE
CLARENCE D. PULSIFER, DEC'D
BY MARGUERITE B. PULSIFER, ADMX
CHARLES W. DAVIS
BURTON H. SMITH
SALVATORE J. NESTA
BY Mitchell Bechert
ATTORNEYS

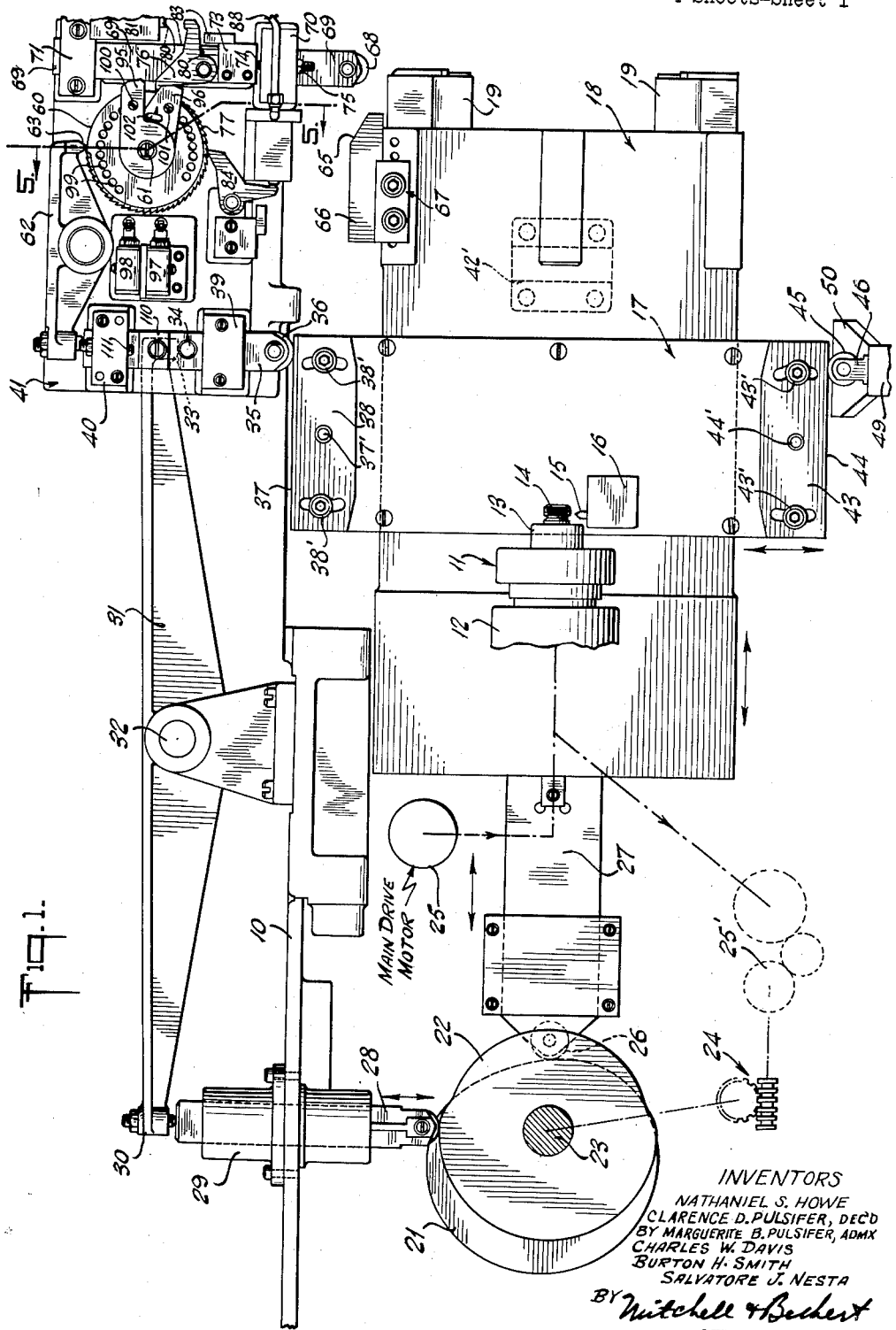

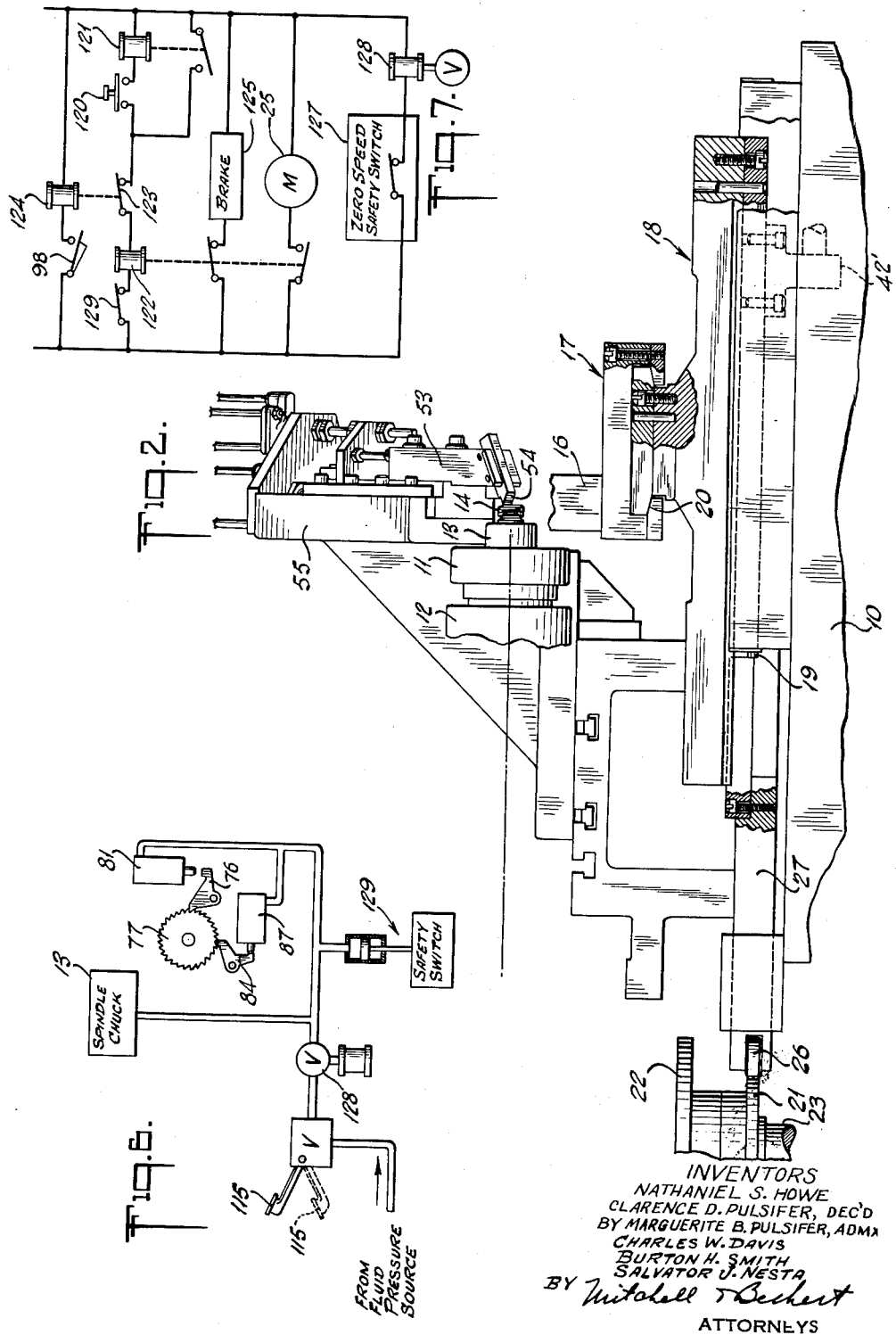

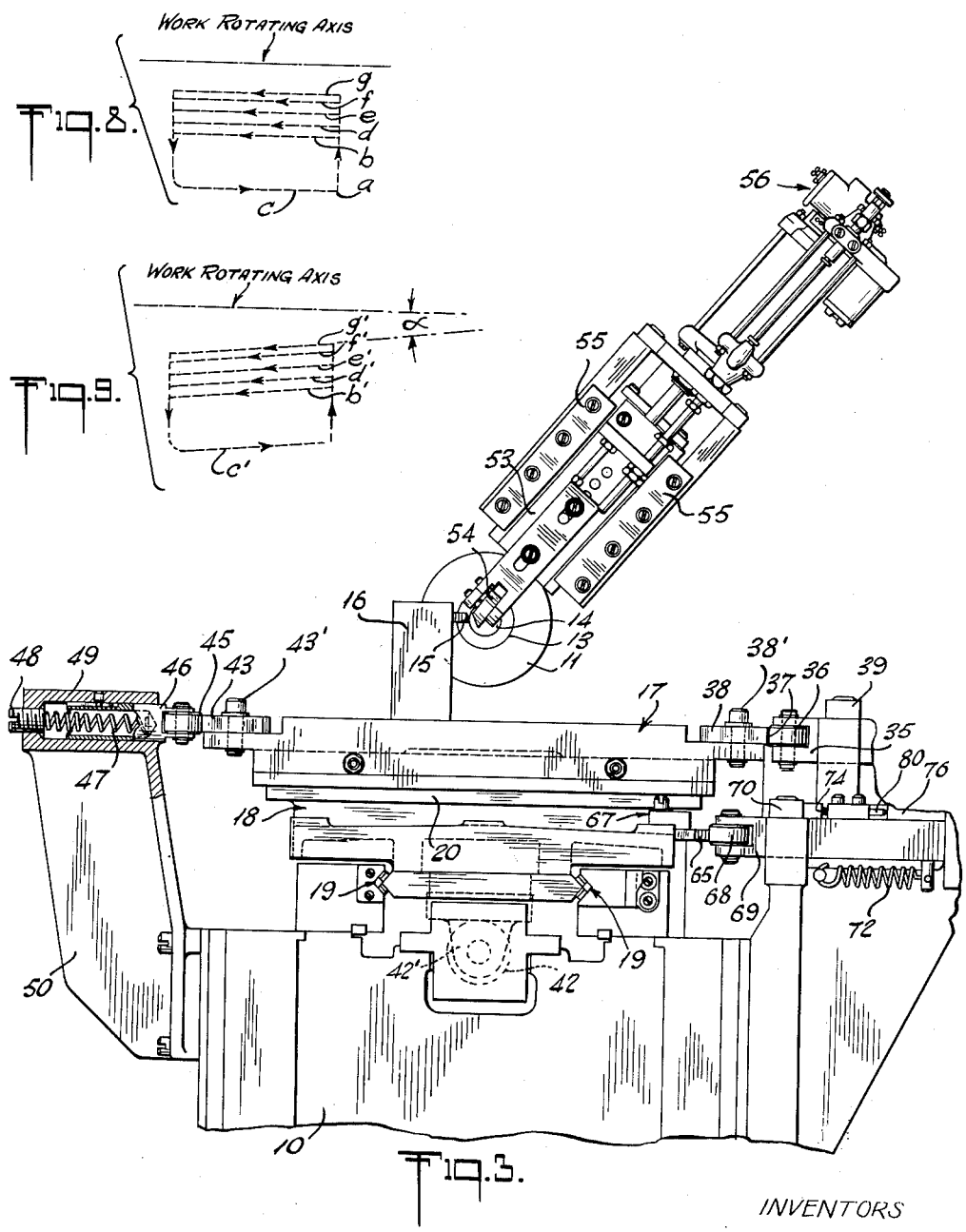

United States Patent Office 3,066,330
Patented Dec. 4, 1962

3,066,330
TABLE-FEED MECHANISM FOR THREAD CUTTING MACHINE
Nathaniel S. Howe, Farmington, and Charles W. Davis, Burton H. Smith, and Salvatore J. Nesta, Newington, Conn., and Clarence D. Pulsifer, deceased, late of Farmington, Conn., by Marguerite B. Pulsifer, administratrix, assignors to The New Britain Machine Company, New Britain, Conn., a corporation of Connecticut
Filed Mar. 13, 1958, Ser. No. 721,254
15 Claims. (Cl. 10—101)

Our invention relates to a lathe mechanism, and in particular, to a lathe adapted to precision thread cutting.

It is an object of the invention to provide an improved machine of the character indicated.

It is a specific object to provide an improved thread-cutting machine of the table-feed variety, namely, one in which the cutting tool is mounted on a table and the table is fed progressively into the work to cut the precision thread.

It is a further specific object to meet the above objects with a mechanism in which automatically indexed tool-feed advances may be achieved up to a final cut having a precision stop location, said precision stop being independent of the feed-advance mechanism, whereby the ultimately cut thread is extremely accurate.

Another specific object is to provide fully automatic feed mechanism meeting the above objects and involving no load on feed-determining parts whenever a new feed-increment setting is being made.

Other objects and various further features of novelty and invention will be pointed out, or will occur to those skilled in the art, from a reading of the following specification in conjunction with the accompanying drawings. In said drawings, which show, for illustrative purposes only, a preferred form of the invention:

FIG. 1 is a simplified plan view of important elements of our mechanism applied to a thread-cutting machine of the table-feed variety;

FIG. 2 is a fragmentary side view in elevation of the machine of FIG. 1, as viewed from the operator's side of the machine;

FIG. 3 is a right-end view in elevation of the machine of FIGS. 1 and 2;

FIG. 4 is an enlarged plan view of automatic table-feed mechanism, forming part of the mechanism of our machine;

FIG. 5 is a vertical sectional view, taken generally along the line 5—5 of FIG. 4;

FIGS. 6 and 7 are simplified schematic diagrams illustrating coaction between elements of our machine; and FIGS. 8 and 9 are simplified diagrams indicating the actual path of the cutting tool throughout a cycle of work in preparing a precision thread cut.

Briefly stated, our invention contemplates an improved table-feed mechanism for a thread-cutting tool wherein the position of the table, whether it be longitudinally or transversely of the work, is determined by resilient loading against abutments. Two continuously running separate cams determine table motion in each of two component directions; longitudinal table motion follows one cam continuously, and the other cam is used to relieve the resilient loading on the transverse or cross-feed mechanism whenever the latter is indexed for a new feed increment. Novel automatically indexing stop mechanism locates the tool for each traverse, the final cut being made against a fixed frame-based abutment independent of the automatically indexed means, so that the ultimate cut may be precisely related direct to the frame, for all pieces turned out by the machine.

Referring to the drawings, our invention is shown in application to a thread-cutting machine having a frame 10 on which a spindle 11 is mounted for rotation in a suitable journal or support 12. The spindle 11 includes chucking means 13 for a work piece 14 to be continuously rotated by motor means (not shown). The tool 15 for performing the thread cut is mounted in a tool holder 16 carried on a table 17, which in turn is constrained by guide means for movement with a first component longitudinally of the spindle axis and with a second component transversely of the spindle axis.

Two-component motion in the table 17 is achieved by the employment of an intermediate table member 18 slidable in frame-based longitudinally elongated guide means 19, and provided on its upper surface with transversely elongated guide means 20 coacting directly with the table or slide 17.

Basic motions for the longitudinal and transverse components of motion determined by the guide means 19—20 are derived from precision circular cams 21—22, both of which are mounted on a common camshaft 23 coupled by means 24 to the work spindle 11 (driven by motor 25) through suitable change gears 25' which drive the camshaft 23 in selective timed relation with the work spindle, as is well known in the art. For the case of longitudinal motion, determined by guide means 19, a cam-follower roll 26 follows the cam 21 and is tied by means 27 directly to the longitudinally reciprocable intermediate table 18, said table being loaded by a fluid-actuated cylinder 42 (see FIG. 3) acting on the bracket 42′, so that the follower 26 may continuously track the thread-lead cam 21.

Basic motion for periodically relieving the transverse feed mechanism to permit incremental advance or re-setting is determined by follower 28 coacting with the second cam 22. Follower 28 is shown guidedly supported by means 29 secured to the frame and operating the end 30 of a rocker-arm or beam 31, pivoted at 32 to the frame 10. The other end 33 of the beam 31 imparts motion to the table 17 by way of an abutment pin 34 carried by a rod or bar 35 having a contact roll 36 continuously riding the precision straight-line surface 37 of a follower plate 38 mounted on the table 17. The bar 35 is shown slidably guided by means 39—40 mounted on an outboard bracket 41 secured to the frame of the machine.

At the other side of the table 17, another plate 43, similar to the plate 38, is mounted with its precision straight edge 44 parallel to the edge 37 of plate 38 and in continuous running contact with a follower roll carried by a spring loaded rod 46. In FIG. 3, the loading for rod 46 is shown to be provided by a coil spring 47 adjustably loaded by means 48 and fully contained within a housing 49, forming part of an outboard bracket 50 secured to the frame 10 of the machine.

To complete the general description of important parts of the machine, a deburring or facing slide is identified at 53 (FIGS. 2 and 3) and is shown to carry a suitable tool 54 for trimming the outer face of the work 14 after completion of a cycled program of cuts on a given work piece 14. The slide 53 is shown guided by means 55 secured to the frame of the machine and including fluid-pressure-operated feed means 56 of conventional configuration.

The progressive feed indexing mechanism of our invention is for the most part carried by the bracket 41 and is shown in detail in FIGS. 1, 4 and 5. Primarily, this mechanism contemplates employment of a precision-formed cam surface 60 automatically indexible (according to selected increments) about a pivot axis 61 on the frame or bracket 41. A rocker arm or feed lever 62 includes a follower end 63 continuously riding the cam 60 and (with cam 60) constitutes a stop against which the table 17 is variously referenced for each successive cut in the cutting program.

It is an important feature of our invention that the levers 62—31 are operated in timed relation such that no load (occasioned by the loading spring 47) is applied to the cam 60 during an indexing operation of the feed cam 60. This synchronism is such that, for every indexing operation of the cam 60, the retracting cam 22 is effective via the lever 31 to shift the table 17 further against the spring 47, thus backing the tool 15 out of the thread groove to permit longitudinal retraction or drawback (determined by cam 21) of the intermediate table 18 and therefore of the tool 15 out beyond the right-hand end of the work. During this retracting movement (i.e. while the load on cam 60 is relieved), trip means coacting between the retracting table member 18 and a part of the feed mechanism 41 are effective to index the cam 60.

In the form shown, the indexing mechanism includes a wedge or cam surface 65 carried on a trip block 66 adjustably secured at 67 to a rear part of the intermediate table 18. The cam surface 65 coacts with the roll 68 of a cam-follower rod 69, slidably guided in means 70—71 secured to the feed bracket 41. The rod 69 is continuously urged by spring means 72 (FIG. 3) to the extreme position shown in FIGS. 1 and 4, wherein the roll 68 is poised to intercept the cam surface 65. This extreme position is determined by abutment of a stop 73 against a stop screw 74, adjustably carried by the guide means 70 and locked by means of nut 75. The rod 69 also pivotally carries an indexing pawl 76 engaged with the teeth of a ratchet wheel 77 mounted for rotation on a shaft 78 (see FIG. 5) journaled in the bracket 41. Spring means 79 contained within the abutment member 73 continuously urges a pin 80 to load the pawl 76 into engagement with teeth of the ratchet wheel 77, and a single-acting penumatic device 81 includes a push-rod 82 (spring-loaded in the retracting direction) for momentarily rotating the pawl 76 in the clockwise sense against the stop 83 whenever the pawl is to be disengaged from the ratchet to permit resetting of the mechanism.

In like manner, a keeper-pawl 84 is pivotally mounted on the bracket 41 and is continuously urged against the teeth of ratchet 77 by means of a spring 85 driving a loading pin 86 against pawl 84. Pneumatically-operated pawl-release mechanism 87 (also spring-loaded in the retracting direction) coacts with the pawl 84 to retract the same whenever the pawl 76 is retracted. A common connection 88 to the two pneumatically operated means 81—87 assures synchronized operation thereof.

In FIG. 5, the stop feed cam 60 is shown keyed at 90 to the shaft 78 and to the ratchet wheel 77, and spring means 91 (mounted below the journal support for the shaft 78) is biased to continuously load cam 60 for rotation in a sense opposed to ratcheting action; this means a clockwise bias in the sense of Figs. 1 and 4. A reset stop position for cam 60 is determined by an arm 92 carried by shaft 78 and engaging an adjustable stop 93 fixed to the frame of bracket 41. This determines the recessed position (the parts relationship of FIG. 4) from which feed motion advances for each new piece of work being operated upon.

In accordance with a further feature of the invention, the cam means 60 is provided with means for automatically shutting down and resetting the feed mechanism upon completion of a succession of cuts on a particular work piece 14. For this purpose, adjustably positionable trip arms 95—96 are carried on the indexing axis 61 and are advanced with successive indexing movements of the cam 60. As noted above, the mechanism as shown in FIGS. 1 and 4 is in the completely reconditioned or start position, but after a succession of cuts, the arms 95—96 and cam 60 will have been indexed counterclockwise until such time as the arm 95 trips a first limit switch 97 and (immediately thereafter) the arm 96 trips a second limit switch 98.

For convenience in selecting total feed, the cam 60 is shown with a plurality of angularly spaced tapped holes 99, providing means whereby various angularly adjusted positions of the arms 95—96 may be selected. Preferably, the angular spacing between holes 99 is so correlated with the spacing of the teeth of ratchet wheel 77 and with the total spiral rise of cam 60 that the spaces between holes 99 (or tooth spacing, there being two teeth per hole spacing) represent easily understandable increments of feed, as for example, feed increments of one thousandth of an inch. A first bolt 100 is shown securing the arm 95 in one of these holes 99, and a second bolt 101 secures the second arm 96 in a different angular position. An opening 102 or window in the lower trip arm 96 provides a viewing port through which an engraved number (indicating total passes or cutting strokes) may be easily read; thus, in FIG. 4, the mechanism is shown set for a total cam-determined feed of 16 passes of cutting tool 15, to be obtained by a succession of indexing operations on the ratchet wheel 77. It will be understood that the number of teeth for each feed increment is determined by the stroke of follower rod 69, adjustably set by stop screw 74.

The mechanism will be better understood from the description of a typical cycle of operation, reference being first had to FIGS. 8 and 9 which schematically indicate the type of cut achievable with the described mechanism. FIG. 8 indicates a parallel or non-tapering cut development which is achieved when the guide plates 38—43 are secured in the position shown in FIG. 1, i.e. with straight edges 37—44 parallel to the spindle axis; this or any other position is set by bolts 38'—43' which determine the angular orientation of plates 38—43 about pivot pins 37'—44', respectively. For a straight or parallel cut, the finished edges 37—44 of these members should be parallel to each other and to the axis of rotation as shown in FIG. 1.

When the mechanism is started for a new work piece 14, the feed parts on table 41 have the relation shown in FIGS. 1 and 4, at which time the follower 63 of the feed lever 62 rests on a high part of the cam 60; the spring loading at 47 against the table 17 thus determines that the tool 15 shall be positioned to make a first cut into the work 14. Longitudinal feed takes place in accordance with the cycle of cam 21 and, upon completion of a tool traverse from right to left (in the sense viewed from the operator's side), the retraction cam 22 is effective via retracting lever 31 to withdraw tool 15 out of the work so that for longitudinal retraction of the slide 17 the tool 15 will clear the work. During this retracting part of the cycle, retracting level 31 relieves any spring load on cam 60 and the feed lever 62 so that, by the time table 18 reaches the fully retracted position (extreme right, from the operator's side), cam follower 68 will have been engaged and driven to advance the pawl 76, and therefore also the cam 60, by the predetermined feed increment, depending upon the stop setting at 74—75. Upon completion of indexing by means of the pawl 76, the retracting cam 22 will have allowed retracting lever 31 to back off from the pin 34, so that spring 47 can again load the tool supporting table or slide 17 against the feed cam 60 via the feed lever 62.

This particular cycle will repeat merely under the control of the cams 20—21 and will recur once for each rotation of the camshaft 23, there being the same predetermined incremental advance of the feed cam 60 at the end of each longitudinal retraction stroke for the slide or table 18.

Let it be assumed that at the end of the last longitudinal retraction stroke for the table 18 (i.e. upon completion of work on the previous work piece 14 and in readiness to start operation on a new work piece 14), tool 15 is positioned at location $a$ in FIG. 8. Upon retraction of the lever 31, the spring 47 is effective to reposition the tool 15 at a first cutting radius designated *b*, said radius being determined by the first abutment of the feed lever 62 at 63 on a high part of the cam 60. Cam 21 will determine longitudinal traverse of the tool 15 along the work during the cut at radius *b*, after which time cam 22 will actuate the retracting lever 31 to relieve spring 47 from action on feed lever 62 and at the same time to withdraw the cutting tool 15 from the work; thus, during longitudinal retraction of the slide table 18 (drawback), the tool 15 will traverse a path *c*. At the furthest retracted location of the table 18, cam-follower roll 68 will be engaged to impart a feed increment to the cam 60, so that by the time the retracting lever 31 permits the tool 15 to reposition itself for cutting, the next cutting radius *d* will have been determined.

The cutting cycle repeats at radius *d*, followed by indexing to radius *e*, and subsequently by indexing to radius *f*, and so on, as necessary to complete the total passes indicated at window 102.

Now, assuming that all rough cuts have been taken at radii *b*, *d*, *e* and *f* in successive traverses along the work, an abutment block 110 on the feed rod or bar 35 will have been positioned closer and closer to an adjustably positioned stop bolt 111 carried by the guide block 40. Therefore, after completing the cutting pass at radius *f*, the next indexing cycle by feed pawl 76 will be such as to determine a feed position of cam 60 corresponding to a lesser effective cutting radius than that determined by abutment at 110—111. The final or finishing cut, therefore, will be made at a final radius *g* which may represent a very much smaller increment of cut than those taken at the radii *b*, *d*, *e*, and *f*. The feed mechanism may be set to provide a plurality of passes after block 110 engages stop bolt 111 to insure precise thread size control. Furthermore, it will be noted that abutment at 110—111 is a precise direct limiting abutment, positively referenced to the frame and, therefore, independent of any wear, back-lash or other sources of error that might otherwise be inherent in any final reliance on a linkage such as that including the rocker arm or feed lever 62.

FIG. 9 illustrates that our machine lends itself with equal facility to the precision cutting of tapered threads on the work piece 14, the extent of taper being selectively adjustable. The only adjustment necessary is at plates 38—43 about pins 37'—44', respectively; the taper angle is determined by the adjustably set angle of edge 37 with respect to the spindle axis, and preferably edge 44 is adjusted parallel to the edge 37 in order to maintain uniform spring pressure on feed table 47 during a cutting traverse. FIG. 9 depicts the successive cutting traverses for a taper thread at angle α to the spindle axis; legends correspond to those of FIG. 8 and are primed notation. Each cutting traverse is seen to be advanced in the same feed increment (except for the finish cut on traverse *g'*), and the tool backs off and enters the work with radial motion.

Having completed the cut on the work, the upper trip arm 95 will on the final drawback (i.e. just after completing the finish cut) be indexed into the position for tripping the switch 97, said switch being connected in disabling relation with the drive to the spindle and enabling the application of a brake for the spindle. The brake may be applied directly to the motor 25. The first switch 97 to be tripped serves to release the infeed slide 53, thus permitting a quick cycle of deburring and facing the end of the work piece after conclusion of the last thread-cutting traverse; the mechanism for performing this function will be understood to be of conventional form and is therefore not described in detail. The second switch 98 to be tripped serves to disconnect motor 25 and apply the brake when the table 18 is in the fully retracted position. Once the spindle has come to a halt, the operator may depress a foot pedal 115 (see FIG. 6) on the machine to admit pneumatic pressure for declutching the work piece and for lifting both the feed and keeper pawls 76—84 so as to permit the torsion spring 91 to reset cam 60 to the starting position, determined by stop 93 (see FIG. 5). Once the operator has removed the work piece (with his foot still on the pedal), he can insert a new piece, release his foot and thus automatically clutch the work and recondition the automatic mechanism for its next recycling cutting program, as will be pointed out below.

Referring to FIG. 7, the operator starts the machine by pushing a start button 120 to complete circuits to a hold-in relay 121 and to a relay 122, thus removing the motor brake 125 and at the same time exciting the motor 25. This starting circuit is completed through the normally closed contacts 123 of a shut-down relay 124, which is excited when the lower trip arm 96 actuates the limit switch 98. Thus, having completed all the successive cutting passes with respect to the work piece, and upon facing off with the cross slide 53, the limit switch 98 completes the circuit to the shut-down relay 124, thus dropping out the hold-in relay 121. It will be noted that this occurs upon a last indexing by pawl 76 as follower 68 rides up the cam 65; in other words, this occurs when the table 18 is in the fully retracted position. Operation of relay 124 serves to disable or de-energize relay 122, thus applying the brake 125 and de-energizing the motor 25. When the spindle has stopped or has virtually stopped, a zero-speed safety switch 127 operating off the motor shaft, complete the circuit to a solenoid valve 128, which is shown in FIG. 6 to be in series with the pneumatic line to the spindle chuck and to the feed-mechanism resetting actuators 81—87. As long as the foot pedal 115 is depressed, and as long as the spindle has been stopped, the chuck 13 will remain open and, for safety purposes, we prefer to employ a pressure-responsive safety-switch mechanism 129 in series with the motor-starting control circuit to assure that the motor cannot be started as long as the spindle chuck is open. Of course, when the foot pedal 15 is released, the actuating pressure will drop, the chuck can close, and the safety switch 129 will permit completion of the motor-starting circuit. The whole cycle may then be restarted merely by pushing the start button 120, as previously described.

It will be seen that we have described an improved thread-cutting machine of the table-feed variety, wherein utmost fidelity of reproduction of threaded pieces is possible because all feed positions, whether they be for rough cuts or for finish cuts, are referenced against a positive stop. The indexible member determining the various positive stop positions is never indexed while in a loaded condition and therefore wear of the parts is brought to an absolute minimum. Furthermore, all final cuts are totally independent of the indexible mechanism and are firmly referenced by direct abutment against the frame.

While the invention has been described in detail for the forms shown, it will be understood that modifications may be made within the scope of the invention as defined in the claims which follow.

We claim:

1. In combination, a frame member, a table member and guide means supporting said table member for longitudinal and transverse movement relatively to said frame member, work-supporting means on one of said members and tool-supporting means on the other of said members, co-ordinated automatically recycling first and second feed mechanisms for imparting a program of longitudinal and transverse movement to said table member, one of said feed means including variably positionable stop means, positive stop means on said frame member, means continuously urging said table member in a direction of limiting abutment by both said stop means, means for transiently relieving said variably positionable stop means during a part of the cycle of one of said feed mechanisms, and means operating during said part of said cycle for automatically incrementally varying the effective stop position of said variably positionable stop means.

2. In combination, a frame member, a table member and guide means supporting said table member for longitudinal and transverse movement relatively to said frame member, work-supporting means on one of said members and tool-supporting means on the other of said members, co-ordinated automatically recycling first and second feed mechanisms for imparting a program of longitudinal and transverse movement to said table member, one of said feed means including variably positionable stop means, positive stop means on said frame member, means continuously urging said table member in a direction of limiting abutment by both said stop means, means operating in timed relation with a portion of the cycle of one of said feed means and transiently acting on said table member to relieve the same from loading both said stop means, and means for automatically incrementally varying the effective stop position of said variable stop means while said table member is transiently relieved therefrom.

3. The combination of claim 2, wherein said positive stop means is effectively located within the range of variation of said variably positionable stop means and directly related to said frame member, said positive stop being positioned to define an ultimate limit of feed of said table member, whereby said variably positionable stop means may determine successive rough cuts and said positive stop means may determine a finish cut on work supported by said work-supporting means.

4. A lathe, comprising a frame, a work-supporting rotatable spindle journaled in said frame, a tool holder and guide means supporting the same on said frame for longitudinal and transverse movement relatively to the spindle axis, coordinated automatically recycling longitudinal and transverse feed mechanisms for imparting a program of longitudinal and transverse movement to said tool holder, said transverse feed mechanism including variably positionable stop means, loading means continuously urging said tool holder transversely of the spindle axis and in a direction of limiting abutment by said stop means, stop-relieving means operating in timed relation with the cycle of said longitudinal feed means for positively displacing said tool holder against the action of said loading means, whereby said stop means is thus transiently relieved from said loading means, and stop-varying means synchronized with operation of said last-defined means for automatically incrementally varying the effective stop position of said stop means.

5. The lathe of claim 4, and having frame based positive stop means for removing the force of said loading means from said variable stop means.

6. A lathe, comprising a frame, a work-supporting rotatable spindle journaled in said frame, a tool holder and guide means supporting the same on said frame for longitudinal and transverse movement relatively to the spindle axis, coordinated automatically recycling longitudinal and transverse feed mechanisms for imparting a program of longitudinal and transverse movement to said tool holder, said transverse feed mechanism including variably positionable stop means, loading means continuously urging said tool holder transversely of the spindle axis and in a direction of limiting abutment by said stop means, stop-relieving means operating in timed relation with the cycle of said longitudinal feed means for positively displacing said tool holder against the action of said loading means, whereby said stop means is thus transiently relieved from said loading means, said stop means comprising a stop cam journaled for indexed rotation in said frame, said cam having a profile of progressively varying effective height as a function of angle about its axis of rotation, indexing means for said stop cam and synchronized with said longitudinal feed mechanism to index said stop cam substantially upon return to fully drawn-back position of said longitudinal feed mechanism and frame based stop means for disabling said stop cam after a predetermined number of terminal indexes.

7. A lathe, comprising a frame, a work-supporting rotatable spindle journaled in said frame, a tool holder and guide means supporting the same on said frame for longitudinal and transverse movement relatively to the spindle axis, longitudinal and transverse positioning cams and means continuously driving the same in 1:1 cyclical relation, follower means continuously connecting said tool holder to follow said longitudinal-positioning cam for longitudinally reciprocating cyclical motion, a frame-based indexibly variable stop, means continuously urging said tool holder transversely in a direction of limiting abutment by said stop means, stop-relieving mechanism following the profile of said transverse-positioning cam and connected to transiently relieve said tool holder from said stop means, and indexing means for said stop means and synchronized with relief of said tool holder therefrom.

8. The lathe of claim 7, in which said stop means includes trip mechanism responsive to a given total angular indexing of said stop means, and automatic reset means for said stop means and operated by said trip mechanism.

9. The lathe of claim 7, in which said stop means includes trip mechanism responsive to a given total angular indexing of said stop means, and automatic shut-down mechanism for said machine and operated by said trip mechanism.

10. A lathe, comprising a frame, a rotatable spindle member journaled in said frame, an intermediate table and elongated guide means coacting between said frame and said intermediate table and guiding the latter for movement longitudinally of the spindle axis, an upper table member and elongated guide means coacting between said intermediate table and said table member and guiding the latter for movement transversely of the spindle axis, work-supporting means on one of said members and tool-supporting means on the other of said members, said table member having a generally longitudinally aligned reference edge thereon, adjustably variable stop means carried by said frame and including a pair of connecting members one of which is referenced at one end to said stop means and at the other end to said reference edge via the other of said connecting members, loading means continuously urging said table member into a transversely limited position determined by said stop means via said other connecting member and said reference edge, frame based stop means co-acting with said other connecting member for precisely controlling the terminal position of said tool, reciprocating longitudinal feed means for said intermediate table, means operating in timed relation with said reciprocating feed means for transiently relieving said loading means, and stop-indexing means operative during relief of said loading means.

11. The lathe of claim 10, in which said reference edge is defined on a plate member angularly adjustably secured to said table member, whereby straight and tapered cuts may be developed depending on the angular adjustment of said plate member.

12. The lathe of claim 11, in which said plate member is secured on one side of said table member, and in which a second plate member is similarly adjustably secured on the opposite side of said table member, said loading means comprising a member transversely slidably guided in said frame and having slidable engagement with said second plate member, and spring means continuously urging said transversely slidable member against said second plate member.

13. A lathe, comprising a frame, a work-supporting rotatable spindle journaled in said frame, a tool holder and guide means supporting the same on said frame for longitudinal and transverse movement relatively to the spindle axis, coordinated automatically recycling longitudinal and transverse feed mechanisms for imparting a program of longitudinal and transverse movement to said tool holder, said transverse feed mechanism including variably positionable stop means, loading means continuously urging said tool holder transversely of the spindle axis and in a direction of limiting abutment by said stop means, and stop-relieving means operating in timed relation with the cycle of said longitudinal feed means for positively displacing said tool holder against the action of said loading means, whereby said stop means is thus transiently relieved from said loading means; said variably positionable stop means comprising a stop cam journaled for indexed rotation on said frame, said cam having a profile of progressively varying effective height as a function of angle about its axis of rotation, a spring biased to continuously urge said stop cam in the direction to determine a maximum cutting radius on work carried by said spindle, and ratchet mechanism incrementally indexed against the action of said spring once for each cycle of said longitudinal feed mechanism, the indexing of said ratchet mechanism being synchronized with the operation of said stop-relieving means.

14. A lathe, comprising a frame, a work-supporting rotatable spindle journaled in said frame, a tool holder and guide means supporting the same on said frame for longitudinal and transverse movement relatively to the spindle axis, coordinated automatically recycling longitudinal and transverse feed mechanisms for imparting a program of longitudinal and transverse movement to said tool holder, said transverse feed mechanism including variably positionable stop means, loading means continuously urging said tool holder transversely of the spindle axis and in a direction of limiting abutment by said stop means; said variably positionable stop means comprising a stop cam journaled for indexed rotation on said frame, said cam having a profile of progressively varying effective height as a function of angle about its axis of rotation, a rocker arm pivotally supported by said frame and having one end adapted to ride the profile of said stop cam, a frame-guided slide member riding the other end of said rocker arm, said slide member being slidable transversely of the spindle axis and having slidable positioning contact with said tool holder; stop-relieving means operating in timed relation with the cycle of said longitudinal feed means for positively displacing said slide member and therefore also said tool holder against the action of said loading means, whereby said stop means is thus transiently relieved from said loading means; and stop-varying means synchronized with the operation of said last-defined means for automatically incrementally rotating said stop cam and thus varying the effective stop position of said stop means.

15. A lathe, comprising a frame, a work-supporting rotatable spindle journaled in said frame, a tool holder and guide means supporting the same on said frame for longitudinal and transverse movement relatively to the spindle axis, coordinated automatically recycling longitudinal and transverse feed mechanisms for imparting a program of longitudinal and transverse movement to said tool holder, said transverse feed mechanism including a fixed frame-based stop and variably positionable stop means, loading means continuously urging said tool holder transversely of the spindle axis and in a direction of limiting abutment by said stop means, said variably positionable stop means comprising a stop cam journaled for indexed rotation on said frame, said cam having a profile of progressively varying effective height as a function of angle about its axis of rotation, a frame-guided slide member slidable transversely of the spindle axis, said slide member being referenced at one end to a part of the profile of said stop cam and at the other end having slidable positioning contact with said tool holder, said slide member also being referenced to said fixed frame-based stop for indexed positions of said stop cam beyond a predetermined rotary position of said stop cam, stop-relieving means operating in timed relation with the cycle of said longitudinal feed means for positively displacing said slide member and therefore also said tool holder against the action of said loading means, whereby both said fixed stop and said variably positionable stop means are thus transiently relieved from said loading means, and stop-varying means synchronized with operation of said last-defined means for automatically incrementally varying the effective stop position of said variably positionable stop means.

References Cited in the file of this patent
UNITED STATES PATENTS

| | | |
|---|---|---|
| 1,354,776 | Pal | Oct. 5, 1920 |
| 2,036,436 | Quichon | Apr. 7, 1936 |
| 2,527,397 | Castelli | Oct. 24, 1950 |
| 2,884,653 | Hahn | May 5, 1959 |